United States Patent
Von Lehmann (10) Patent No.: US 12,498,030 B2
(45) Date of Patent: Dec. 16, 2025

(54) FLEXIBLE GEARWHEEL DISC AND FLEXIBLE GEARWHEEL FOR A HIGH-REDUCTION GEAR MECHANISM, AND A HIGH-REDUCTION GEAR MECHANISM OF THIS TYPE

(71) Applicant: Maxon International AG, Sachseln (CH)

(72) Inventor: Ernst Von Lehmann, Glottertal (DE)

(73) Assignee: Maxon International AG, Sachseln (CH)

( * ) Notice: Subject to any disclaimer, the term of this patent is extended or adjusted under 35 U.S.C. 154(b) by 51 days.

(21) Appl. No.: 18/575,127

(22) PCT Filed: Jul. 6, 2022

(86) PCT No.: PCT/EP2022/068690
§ 371 (c)(1),
(2) Date: Dec. 28, 2023

(87) PCT Pub. No.: WO2023/280900
PCT Pub. Date: Jan. 12, 2023

(65) Prior Publication Data
US 2024/0352995 A1   Oct. 24, 2024

(30) Foreign Application Priority Data
Jul. 6, 2021   (EP) .................................... 21184038

(51) Int. Cl.
*F16H 49/00* (2006.01)
*F16H 55/08* (2006.01)
(52) U.S. Cl.
CPC ....... *F16H 49/001* (2013.01); *F16H 55/0833* (2013.01); *F16H 2049/003* (2013.01)

(58) Field of Classification Search
CPC .............. F16H 49/001; F16H 55/0833; F16H 2049/003
See application file for complete search history.

(56) References Cited

U.S. PATENT DOCUMENTS

2021/0156460 A1*   5/2021   Zimmermann ....... F16H 49/001

FOREIGN PATENT DOCUMENTS

| CN | 109578547 A | 4/2019 | |
| DE | 19518053 C1 * | 8/1996 | ........... F16H 49/001 |
| DE | 10021236 A1 | 11/2001 | |
| DE | 102005016803 A1 | 10/2006 | |
| EP | 3828442 A1 | 6/2021 | |

OTHER PUBLICATIONS

DE 19518053 C1 (Year: 1996).*

* cited by examiner

Primary Examiner — Terence Boes
(74) Attorney, Agent, or Firm — Dickinson Wright PLLC (57) ABSTRACT

The flexible gearwheel disc is configured for a high-reduction gear mechanism that has at least two gearwheel segments which are arranged next to one another in the circumferential direction of the gearwheel disc and are connected to one another by means of spring segments. The gear mechanism includes a flexible gearwheel with at least two flexible gearwheel discs. The flexible gearwheel, at the same time makes increased flexibility of the gearwheel discs or of the gearwheel in the radial direction and an increased rigidity in the circumferential direction possible. The spring segments run obliquely with respect to the circumferential direction of the gearwheel disc.

20 Claims, 7 Drawing Sheets

FLEXIBLE GEARWHEEL DISC AND FLEXIBLE GEARWHEEL FOR A HIGH-REDUCTION GEAR MECHANISM, AND A HIGH-REDUCTION GEAR MECHANISM OF THIS TYPE

CROSS-REFERENCE TO RELATED APPLICATION

This application claims priority to and the benefit of PCT Patent Application No. PCT/EP2022/068690, filed 6 Jul. 2022, entitled "FLEXIBLE GEARWHEEL DISC AND FLEXIBLE GEARWHEEL FOR A HIGH REDUCTION GEAR MECHANISM AND A HIGH REDUCTION GEAR MECHANISM OF THIS TYPE" and to European Patent Application No. 2 118 4038.4, filed Jul. 6, 2021, and entitled "FLEXIBLE GEARWHEEL DISC AND FLEXIBLE GEARWHEEL FOR A HIGH REDUCTION GEAR MECHANISM AND A HIGH REDUCTION GEAR MECHANISM.".

BACKGROUND

1. Field

The present disclosure relates to a flexible gearwheel disc for a high reduction gear mechanism with at least two gearwheel segments arranged next to one another in the circumferential direction of the gearwheel disc, which are connected to one another by means of spring segments. Furthermore, the disclosure also relates to a flexible gearwheel for a high reduction gear mechanism comprising at least two of the flexible gearwheel discs which are arranged next to one another in the axial direction, and to a gear mechanism with a ring gear, with a flexible gearwheel arranged in the ring gear and with a wave generator which is connected to the flexible gearwheel and which deforms the flexible gearwheel so that it meshes with the ring gear in certain areas.

2. Related Art

A flexible gearwheel of this type comprising a plurality of flexible gearwheel discs and a high reduction gear mechanism with such a flexible gearwheel are known, for example, from EP 3 828 442 A1. It is already described there that the flexible gearwheel has at least two flexible gearwheel discs arranged next to one another in the axial direction and each flexible gearwheel disc comprises gearwheel segments arranged next to one another in the circumferential direction, which are connected to one another by means of spring segments. The spring segments mesh in the radial direction of the gearwheel approximately in the center of the gearwheel segments and are configured as circular ring sections. The spring segments thus lie on a circle that is concentric with the flexible gearwheel and thus run in the circumferential direction of the flexible gearwheel or flexible gearwheel discs. Each flexible gearwheel disc comprises two different types of gearwheel segments, which are arranged alternately. Each of the gearwheel segments comprises a head area and a foot area. The head area of the gearwheel segments is each provided with an external toothing that can be meshed with the internal toothing of a ring gear. The foot area of the gearwheel segments is in contact with a wave generator. A rotary movement of the wave generator causes the flexible gearwheel to be pressed outwards in certain areas and meshed with the ring gear. The first type of the gearwheel segments each has a recess arranged approximately in the center of the gearwheel segment, in which a pin is received in order to transmit a rotary movement of the flexible gearwheel to an output. The second type of the gearwheel segments does not have a recess, but is waisted in the center. This is where the spring segments mesh. As a result, the length of the spring segments can be increased and a good combination of flexibility and stability of the flexible gearwheel discs and thus of the flexible gearwheel is achieved.

Furthermore, DE 100 21 236 A1 shows a reduction gear mechanism with a wave generator, a pot-shaped flex spline and a circular spline interacting with the flex spline. The pot-shaped flex spline comprises a tooth area which is provided with an internal toothing and an external toothing. The internal toothing interacts with the wave generator, the external toothing meshes with the internal toothing of the circular spline. Furthermore, the pot-shaped flex spline comprises an annular area arranged in the axial direction next to the tooth area to impinge on a hub part. The ring area is connected to the hub part by means of curved spokes that are resilient in a radial direction.

From CN 109 578 547 A, a flexible gearwheel for a gear mechanism is known, wherein the flexible gearwheel comprises individual rigid segments which are spaced apart from one another by means of spacers. Each of the segments comprises a sliding area, which is slidingly guided in the spacers, and a rigid, arcuate tooth plate. Each of the segments is connected to a helical spring acting in a radial direction, via which it can be pressed outwards.

DE 10 2005 016 803 A1 shows a harmonic Drive gear mechanism with a fixed, internally toothed circular spline, a radially movable flex spline with an inner surface and an external toothing and a wave generator, which is connected to a drive device and circumferentially meshes parts of the external toothing of the flex spline with the internal toothing of the circular spline. Radially movable connecting elements are arranged between the radially movable flex spline and a cylindrical output element so that the Harmonic Drive gear mechanism can be built to be flat with few components. The flex spline and the output element can either be arranged in axially offset planes or nested together in one plane.

SUMMARY

It is the object of the present disclosure to further improve the devices known from the prior art and, in particular, to provide a flexible gearwheel disc, a flexible gearwheel with at least two flexible gearwheel discs and a gear mechanism with a flexible gearwheel, which at the same time make increased flexibility of the gearwheel discs or the gearwheel in the radial direction and increased rigidity in the circumferential direction possible.

This problem is solved according to the disclosure with regard to the flexible gearwheel disc for a high reduction gear mechanism with at least two gearwheel segments arranged next to one another in the circumferential direction of the flexible gearwheel disc, which are connected to one another by means of spring segments, in that the spring segments run obliquely to the circumferential direction of the flexible gearwheel disc. In the present case, the term "disc" or "gearwheel disc" is used to define a component the axial extension of which is very small compared to its radial extension. Due to the fact that the spring segments run obliquely to the circumferential direction of the flexible gearwheel disc, the spring length required for the desired radial flexibility is achieved on the one hand. On the other hand, the oblique course of the spring segments results in the spring segments engaging with the neighbouring gearwheel segments at different heights. This leads to the fact that when the flexible gearwheel disc is deformed by a wave generator and a load torque acts on the gearwheel segments, a direction of distortion is predetermined for the gearwheel segments.

In a preferred embodiment, it can be provided that a longitudinal axis of each spring segment includes an angle $\alpha > 0°$ with a tangent abutting the circumference of the flexible gearwheel disc at a central circumferential position of the spring segment, preferably an angle $\alpha$ in a range of 10°-70°, particularly preferably an angle $\alpha$ of 35°-55°. The longitudinal axis of the spring segment is the axis that extends centrally in the width and thickness of the spring segment between the two connection points of the spring segment with the two neighbouring gearwheel segments. The central circumferential position of the spring segment is the position at which the spring segment is divided into two parts of equal length along its longitudinal extension. The spring segments are essentially rod-shaped or strip-shaped, so that their longitudinal extension is significantly greater than their width and thickness. The configuration described achieves the oblique arrangement of the spring segment or spring segments, which leads to the advantages mentioned above, namely increased radial flexibility with a simultaneous increase in rigidity in the circumferential direction.

In order to achieve a particularly flat configuration, it can be provided that the spring segments are configured such that they lie in a plane with the gearwheel segments and thus in a plane with the flexible gearwheel disc. This common plane extends perpendicularly to the axial direction, i.e. perpendicularly to the axis of rotation of the toothed disc.

Preferably, the spring segments are arranged in the circumferential direction between the gearwheel segments.

In a further preferred embodiment, it may be provided that at least one of the spring segments extends from a head area of a gearwheel segment to the foot area of the gearwheel segment arranged next to it in the circumferential direction of the flexible gearwheel disc. The two connection points of the spring segments with the two adjacent gearwheel segments are therefore on different sides of a center circle that runs halfway up the gearwheel segments. This leads to a very large length of the spring segments and thus to the achievement of the desired radial flexibility in combination with the increase in rigidity in the circumferential direction of the flexible gearwheel disc.

Preferably, the gearwheel segments are only connected to each other via the spring segments.

Advantageously, it can also be provided that a slot is formed in the foot area of at least one of the gearwheel segments above the spring segment. Preferably, the slot is located above the point or area at which the spring segment engages with the gearwheel segment or merges into the gearwheel segment. The slot preferably runs parallel to the spring segment. This increases the elasticity of the gearwheel segment or gearwheel segments and leads to the desired deformability.

This desired deformability can be further increased if an undercut is formed in the head area of at least one of the gearwheel segments below the spring segment. The undercut is also preferably formed parallel to the extension of the spring segment. The undercut is significantly shorter than the slot formed in the foot area of the gearwheel segments. Preferably, the length of the undercut is a maximum of 0.3 times the length of the slot.

With regard to the flexible gearwheel for a high reduction gear mechanism, the above-mentioned problem is solved according to the disclosure in that the flexible gearwheel comprises at least two flexible gearwheel discs arranged next to one another in the axial direction and configured as described above, wherein the flexible gearwheel discs are arranged such that the spring segments of the flexible gearwheel discs arranged next to one another intersect. Neighbouring flexible gearwheel discs are thus arranged such that they are rotated by 180° with respect to an axis extending perpendicularly to the axis of rotation of the flexible gearwheel discs (thus about an axis extending in the radial direction of the flexible gearwheel discs). In a top view in the axial direction of the flexible gearwheel discs arranged next to one another, the spring segments of the neighbouring or adjacent gearwheel discs therefore intersect. In addition to improving the rigidity of the flexible gearwheel, the diagonally running and intersecting spring segments also improve the efficiency, noise development, backlash and service life.

A further increase in the rigidity in the circumferential direction of the flexible gearwheel can be achieved in that at least one, and in particular in the circumferential direction at least every second, of the gearwheel segments of each flexible gearwheel disc is connected, preferably firmly connected, to the gearwheel segment of the flexible gearwheel disc arranged next to it in the axial direction, i.e. in the direction of the axis of rotation. When the flexible gearwheel is installed in a gear mechanism, the external toothing of the gearwheel segments meshes with the internal toothing of a ring gear. Due to the deformation of the flexible gearwheel or the flexible gearwheel discs, at least two and preferably four (two next to each other on opposite sides of the flexible gearwheel or the flexible gearwheel disc) gearwheel segments of each flexible gearwheel disc are always meshing with the ring gear toothing. Since the flexible gearwheel discs lying next to one another in the axial direction are each rotated by 180° to one another about a radial axis so that their spring segments intersect, the gearwheel segments of the flexible gearwheel discs arranged next to one another in the axial direction rotate in opposite directions to one another when the flexible gearwheel discs and thus the flexible gearwheel are deformed. By connecting the gearwheel segments of the flexible gearwheel discs arranged next to one another in the circumferential direction in a way that determines the direction of rotation, the gearwheel segments are prevented from rotating in the same direction. The axially abutting gearwheel segments can only rotate alternately in opposite directions. As the abutting gearwheel segments are firmly connected to one another and mesh with a ring gear when installed in a gear mechanism, these gearwheel segments prevent each other from rotation. This increases the rigidity. However, the flexibility of the gearwheel in the radial direction is still given and the flexible gearwheel can adapt to the deformation caused by the wave generator. Preferably, the flexible gearwheel is adapted such that each or, in the circumferential direction, every second one of the gearwheel segments of each flexible gearwheel disc is firmly connected to the gearwheel segment of the adjacent flexible gearwheel disc or discs arranged next to it in the axial direction. The gearwheel segments of the flexible gearwheel discs arranged next to one another in the axial direction or abutting one another thus form gearwheel segment groups, each of which extends over the entire width of the flexible gearwheel.

The fixed connection of the adjacent gearwheel segments of flexible gearwheel discs arranged next to one another can be achieved in a simple configuration in that the in axial direction abutting gearwheel segments of the flexible gearwheel discs arranged next to one another are pinned together.

With regard to the gear mechanism, the problem described above is solved in that the gear mechanism comprises a ring gear, a flexible gearwheel arranged in the ring gear and a wave generator, wherein the wave generator is connected to the flexible gearwheel and deforms the flexible gearwheel so that it meshes with the ring gear in certain areas, and wherein the flexible gearwheel is configured as described above. Due to the flexible gearwheel with increased stiffness in the circumferential direction used in the gear mechanism, the efficiency, noise, backlash and service life are improved.

In a simple configuration, the gear mechanism can preferably be configured such that at least one of the gearwheel segments of the flexible gearwheel is connected to an output drive such that a rolling rotary movement of the flexible gearwheel is transmitted into a simple rotary movement.

This can be achieved, for example, in that a support disc is arranged on at least one side of the flexible gearwheel and at least one bolt, which is in contact with the at least one support disc, is guided through at least one of the gearwheel segment groups formed by the gearwheel segments lying next to each other in the axial direction. Preferably, it can be provided that a support disc is arranged on both sides of the flexible gearwheel and that the at least one bolt is in contact with both support discs. Preferably, the two support discs are rigidly connected to one another via axes. The axes have no contact with the flexible gearwheel.

In order to achieve a stable and symmetrical configuration, it may be provided that at least one bolt, which is in contact with the at least one support disc, is guided through each of the gearwheel segment groups of the flexible gearwheel, which are formed by the gearwheel segments lying next to one another in the axial direction. It can also be provided that several, preferably two, bolts are guided through each of the gearwheel segment groups, which are in contact with the support discs arranged laterally next to the flexible gearwheel. This increases the stability of the entire construction.

In order to enable the transmission of the rolling rotary movement of the flexible gearwheel to the support discs, it can be provided that the at least one bolt is mounted in a stationary but rotatable manner relative to the at least one gearwheel segment group, thus relative to the gearwheel segments through which it is guided, and rolls on a closed contour in the at least one support disc. This enables a simple and stable configuration.

In an alternative embodiment, it may be provided that the at least one bolt is mounted in a stationary but rotatable manner relative to the at least one support disc and rolls on a closed contour in the at least one gearwheel segment group, thus in the gearwheel segments through which it is guided.

In yet another alternative embodiment, it can be provided that the at least one bolt rolls both on a closed contour in the at least one support disc and on a closed contour in the at least one gearwheel segment group, thus in the gearwheel segments through which it is guided, wherein the contour of the at least one support disc and the contour in the respective gearwheel segments are configured such that their circumferential length is the same. This also enables a safe and stable transmission.

In a further preferred configuration, it can be provided that the spring segments of the flexible gearwheel discs lying next to one another in the axial direction intersect at the radial height of the at least one bolt. This configuration also contributes to achieving the desired flexibility.

Furthermore, the efficiency of the gear mechanism can also be increased by the fact that the flexible gearwheel does not rest directly on the wave generator or on a flex bearing arranged on the wave generator, but that at least one roller is arranged in a foot area of at least some of the gearwheel segment groups of the flexible gearwheel formed by the gearwheel segments lying next to one another in the axial direction, which are in contact with the at least one wave generator. The contact between the wave generator and the rollers can be direct or indirect, depending on whether other components, such as a flex bearing, are arranged on the wave generator. Each of the rollers is preferably mounted in the center of the corresponding gearwheel segment group. It can also be provided that several rollers are arranged per gearwheel segment group, for example two rollers per gearwheel segment group. In this case, the rollers are preferably arranged at the edges of the gearwheel segment groups so that only every second gearwheel segment of the corresponding gearwheel segment group is in contact with the respective roller.

BRIEF DESCRIPTION OF THE DRAWINGS

In the following, the disclosure is explained in more detail with reference to drawings. Therein.

DETAILED DESCRIPTION OF THE ENABLING EMBODIMENT

Figure 1:
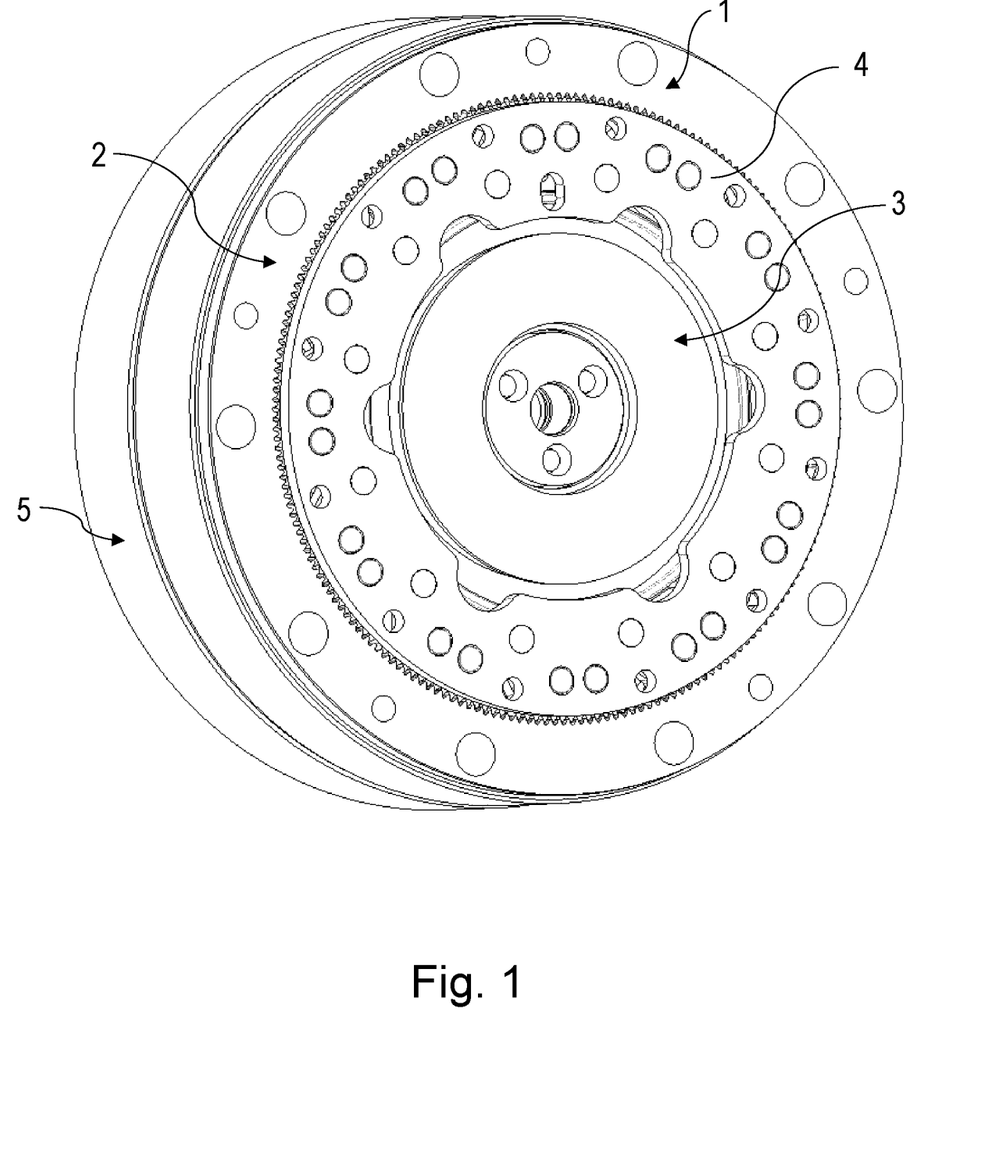
FIG. 1: shows a three-dimensional view of a high reduction gear mechanism according to the disclosure.

FIG. 1 shows a three-dimensional view of a high reduction gear mechanism 1. The high reduction gear mechanism 1 comprises a ring gear 2, a flexible gearwheel arranged in the ring gear 2 (not shown in FIG. 1), a wave generator 3 which is in contact with the flexible gearwheel, two support discs 4 arranged laterally next to the flexible gearwheel and a housing 5.

Figure 2:
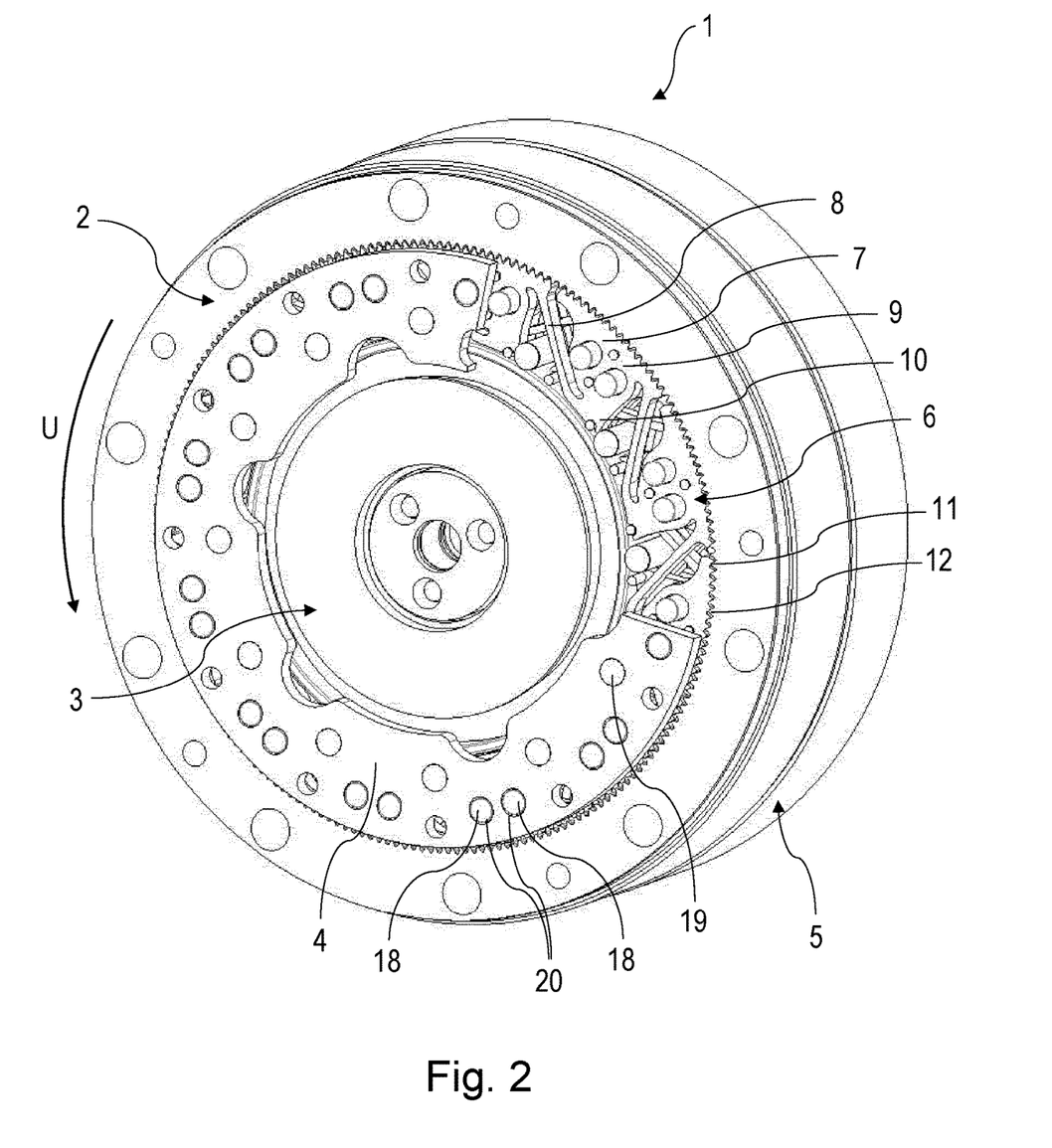
FIG. 2: shows a three-dimensional view of the gear mechanism from FIG. 1, partially sectioned.

In FIG. 2, the front support disc 4 of the gear mechanism 1 is partially sectioned, allowing a view into the interior of the gear mechanism 1. The flexible gearwheel 6 can therefore be seen in FIG. 2. The flexible gearwheel 6 comprises gearwheel segments 7 arranged next to one another in the circumferential direction, which are elastically connected to one another by means of spring segments 8. The individual gearwheel segments 7 are arranged slightly spaced apart from one another. Each of the gearwheel segments 7 comprises a head area 9 and a foot area 10. The head areas 9 of the gearwheel segments 7 are provided with an external toothing 11. The ring gear 2 comprises an internal toothing 12. The foot areas 10 of the gearwheel segments 7 are in contact with the wave generator 3 or can be brought into contact with it.

By means of the wave generator 3, the flexible gearwheel 6 is deformed so that the external toothing 11 of at least two gearwheel segments 7 is brought to mesh with the internal toothing 12 of the ring gear 2. By means of the wave generator 3, areas of the flexible gearwheel 6 are therefore pressed outwards. This is made possible by the spring segments 8, which allow the flexible gearwheel 6 to move in the radial direction R (shown in FIG. 3).

As can be seen in FIG. 2, the spring segments 8 are configured as band-shaped elements. This means that the longitudinal extension of the spring segments 8 is significantly greater than their thickness and width. The spring segments 8 extend obliquely to the circumferential direction U of the flexible gearwheel 6. The spring segments 8 thus extend from the foot area 10 of a first gearwheel segment 7 to the head area 9 of the neighbouring gearwheel segment 7.

The exact structure of the flexible gearwheel 6, in particular the connection with the support discs 4 and the arrangement on or contact with the wave generator 3 will be explained in more detail below with reference to the further drawings.

Figure 3:
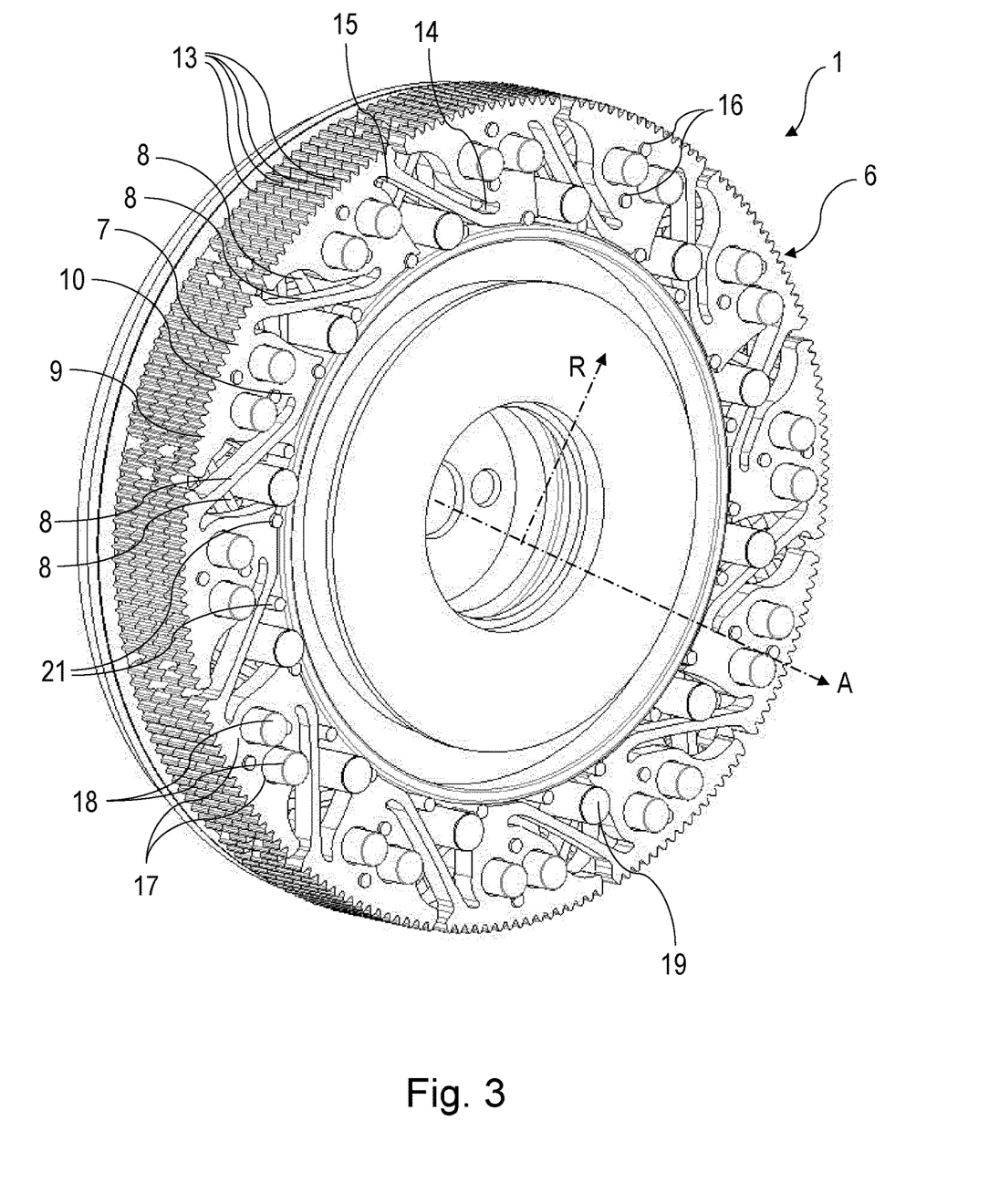
FIG. 3: shows a three-dimensional view of the gear mechanism from FIG. 1 without housing.

FIG. 3 shows a three-dimensional view of the flexible gear mechanism 1 without the housing and without the ring gear. The flexible gearwheel 6 comprises four flexible gearwheel discs 13, which are arranged next to one another in axial direction A, thus along the axis of rotation. The gearwheel discs 13 are preferably configured as identical parts. The flexible gearwheel discs 13 are each formed in one piece. The axial extension of each gearwheel disc 13 is small compared to the radial extension of the gearwheel disc 13, which distinguishes the gearwheel discs from conventional pot-shaped flex spines, for example.

Each of the flexible gearwheel discs 13 is structured as described above and comprises gearwheel segments 7 arranged next to one another in the circumferential direction U, which are connected to one another by means of spring segments 8. The gearwheel segments 7 and the spring segments 8 are arranged in a plane that extends perpendicularly to the axis of rotation of the gearwheel disc. The gearwheel segments 7 of each flexible gearwheel disc 13 are arranged slightly spaced apart from one another. As described above, each of the gearwheel segments 7 comprises a head area 9 and a foot area 10. The head areas 9 of the gearwheel segments 7 are provided with an external toothing 11. The foot areas 10 of the gearwheel segments 7 are in contact with the wave generator 3 or can be brought into contact with it. The spring segments 8 are configured as band-shaped elements the longitudinal extent of which is significantly greater than their thickness and width. The spring segments 8 extend obliquely to the circumferential direction U of the flexible gearwheel. The spring segments 8 thus extend from a foot area 10 of a first gearwheel segment 7 to the head area 9 of the neighbouring gearwheel segment 7. The flexible gearwheel discs 13 arranged neighbouring one another are each rotated by 180° relative to one another about an axis running in the radial direction of the flexible gearwheel 6, so that the spring segments 8 of the adjacent gearwheel discs 13 cross one another. The diagonally extending and intersecting spring segments 8 increase the rigidity of the flexible gearwheels 13 and thus also of the flexible gearwheel 6 in the circumferential direction. Flexibility in the radial direction is still given so that the flexible gearwheel 6 can adapt to the deformation caused by the wave generator 3. The efficiency, noise development, backlash and service life are also improved. The diagonal arrangement of the spring segments 8 means that the necessary spring length is achieved.

In the embodiments shown, both the gearwheel segments 7 and the spring segments 8 of all flexible gearwheel discs 13 are identically configured. Each of the gearwheel segments 7 comprises the foot area 10 and the head area 9. The external toothing 11 is formed in the head area 9. The spring segments 8 extend starting from the foot area 10 of a first gearwheel segment 7 to the head area 9 of the adjacent gearwheel segment 6 in the circumferential direction. As a result, the diagonal arrangement of the spring segments 8 is achieved. The spring segments 8 do not have to be connected to the gearwheel segments 7 exactly in the head area and in the foot area. It is sufficient if one end of the spring segments lies above an imaginary center circle and the other end of the spring segments lies below the imaginary center circle. The term "center circle" is used here to describe a circle that is concentric with the flexible gearwheel disc 13 and runs in a radial direction at half the height of the gearwheel segments 7. Furthermore, a slot 14 is formed in each gearwheel segment 7, which runs above and parallel to the spring segments 8. This slot 14 increases the elasticity of the spring segments 7 in the foot area. In the head area 9 of the gearwheel segments 7, an undercut 15 is formed in each case, which also leads to increased elasticity of the spring segments 7 in this area. The length of the undercuts 15 is significantly shorter than the length of the slot 14 and is at most one third of the length of the slot 14. By the foot and head areas of the gearwheel segments, a direction is defined, starting from the foot areas, towards the head areas, thus in a radial direction starting from the center of the gearwheel discs outwards. The slots 14 are thus formed on the side of the spring segments 14 facing the head areas 9 of the gearwheel segments 7. The undercuts 15 are formed on the side of the spring segments 14 facing away from the head areas 9 of the gearwheel segments 7.

Each gearwheel segment 7 is thus connected on one side in the foot area 10 to the spring segment 8 arranged there and on the other side in the head area 9 to the spring segment 8 arranged there. As a result, the body of the gearwheel segments 7 is asymmetrical. The flexible gearwheel discs 13 are arranged next to one another such that the gearwheel segments 7 essentially overlap. As the gearwheel segments 7 are asymmetrical in themselves, this arrangement results in the head area 9 and thus the external toothing 11 of the gearwheel segments 7 of the adjacent gearwheel discs 13 overlapping. Preferably, the gearwheel segments 7 arranged next to one another in the axial direction each overlap by one tooth. This also leads to increased stability of the flexible gearwheel 6. The gearwheel segments 7 of the flexible gearwheel discs 13 lying next to one another in the axial direction are firmly connected to one another. In the embodiments shown, the adjacent gearwheel segments 7 are firmly pinned together with pins 16. Due to the adjacent gearwheel segments 7 being pinned together, gearwheel segment groups are thus formed.

Furthermore, each gearwheel segment 7 comprises two recesses 17. The flexible gearwheel discs 13 are arranged such that the recesses 17 of the gearwheel segments 7, which are pinned together, lie one above the other or are congruent.

A bolt 18 is received in each of the recesses 17 lying one above the other. As can be seen in FIGS. 1 and 2, the bolts 18 are in contact with the support discs 4 arranged laterally next to the flexible gearwheel 6. For this purpose, the support discs 4 also have recesses 20 which are in contact with the bolts 18. Due to the bolts 18, the rolling rotary movement of the flexible gearwheel 6 is reduced to a simple rotary movement of the support discs 4. The arrangement of the bolts 18 in the recesses 17 of the flexible gearwheel discs and in the recesses 20 of the support discs is described in more detail below with reference to FIG. 7. Of course, only one bolt or several bolts per gearwheel segment could also be provided for transmitting the rotary movement of the flexible gearwheel to the laterally arranged support discs.

The support discs 4 are rigidly connected to each other via axes 19, without the axes 19 being in contact with the flexible gearwheel 6 (see also FIGS. 1 and 2).

Rollers 21 are arranged at the foot areas 10 of the gearwheel segments 7, via which the gearwheel segments 7 are in contact with the wave generator 3. This results in rolling friction instead of sliding friction at the contact location between the gearwheel segments 7 and the wave generator 3 or a flexible bearing arranged between the wave generator 3 and the flexible gearwheel 6. This increases the efficiency of the gear mechanism, as the friction losses during the relative movement between the gearwheel segments and the wave generator are minimised. In the embodiment shown in FIG. 3, two rollers 21 are arranged on each gearwheel segment group. The rollers 21 are arranged eccentrically on the gearwheel segments 7 and are located on the side of the foot area 10 of the gearwheel segments 7 on which no spring segment 8 engages. The rollers 21 are therefore only in contact with every second gearwheel segment 7 of a gearwheel segment group.

Figure 4:
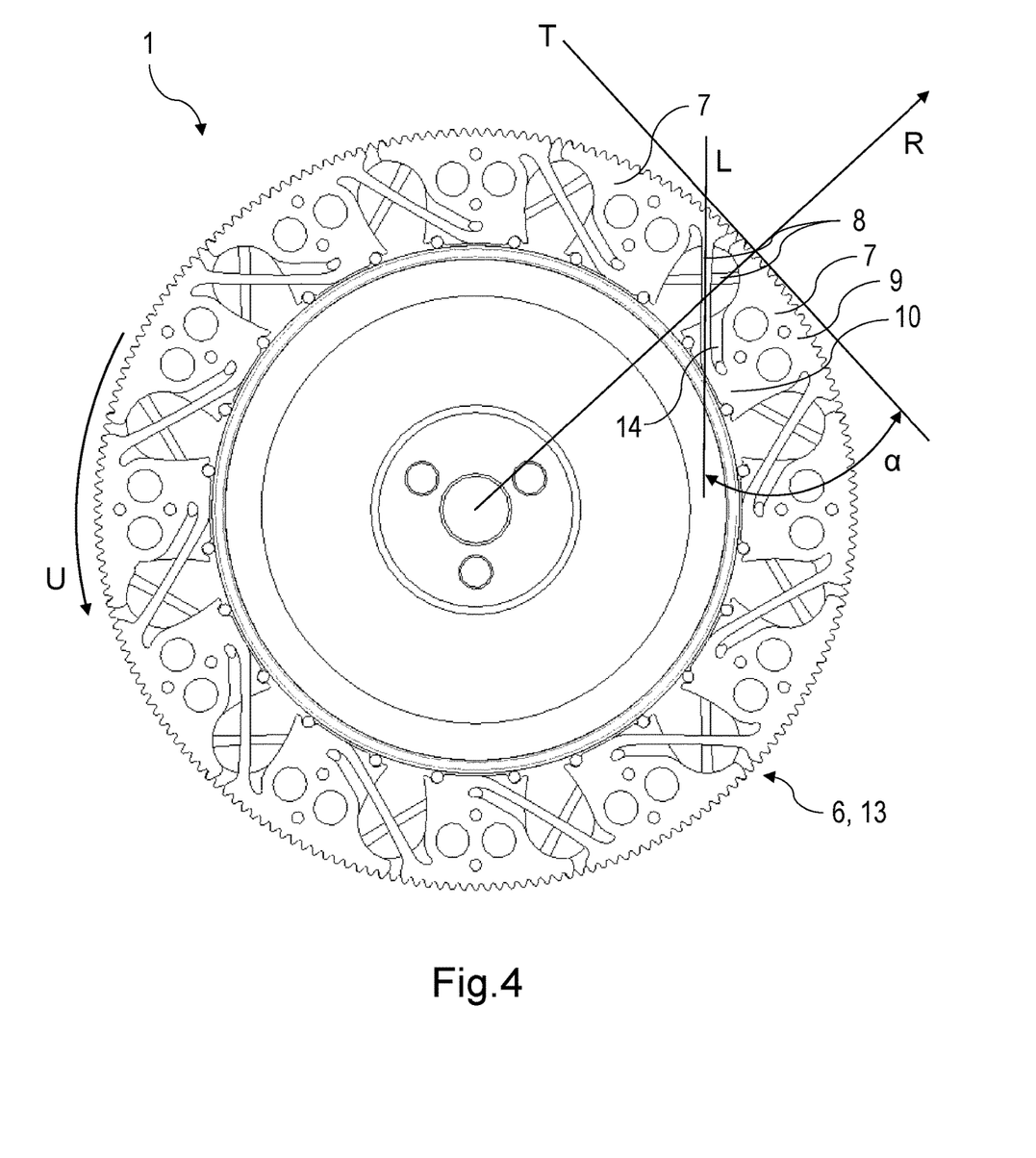
FIG. 4: shows a front view of a flexible gearwheel of the gear mechanism shown in FIG. 1.

FIG. 4 shows a front view of the gear mechanism 1 without the housing and the support discs. The configuration of the flexible gearwheel discs 13 described above can be clearly seen. Each flexible gearwheel disc 13 comprises a plurality of gearwheel segments 7 arranged next to one another in the circumferential direction, each of which is connected to one another by means of spring segments 8. In the embodiment shown, each flexible gearwheel disc 13 comprises twelve gearwheel segments 7 and twelve spring segments 8. The spring segments 8 run obliquely to the circumferential direction U of the flexible gearwheel discs 13. As already described, the spring segments 8 are elongated. The longitudinal extension of the spring segments 8 is therefore significantly greater than their width and thickness. Each spring segment 8 therefore has a longitudinal axis L. The longitudinal axis L of each spring segment 8 is the axis that extends centrally in the width and thickness of the spring segment 8 between the two connection points of the spring segment 8 with the two neighbouring gearwheel segments 7. The longitudinal axis L of each spring segment 8 includes an angle $\alpha$ with a tangent T, wherein the tangent T abuts the circumference of the gearwheel disc 13 at the height of the central circumferential position of the corresponding spring segment. The central circumferential position of the spring segment is the position at which the spring segment is divided into two parts of equal length along its longitudinal extension. This angle $\alpha$ is >0 and is preferably in a range of 10 to 70° and particularly preferably in a range of 35 to 55°. In the embodiment shown, the spring segments 8 are configured such that they lie in a plane with the gearwheel segments 7 and thus in a plane with the flexible gearwheel disc 13. In this preferred embodiment variant, the spring segments 8 are arranged in the circumferential direction between the gearwheel segments 7. Furthermore, the gearwheel segments 7 are preferably only connected to each other via the spring segments 8.

Figure 5:
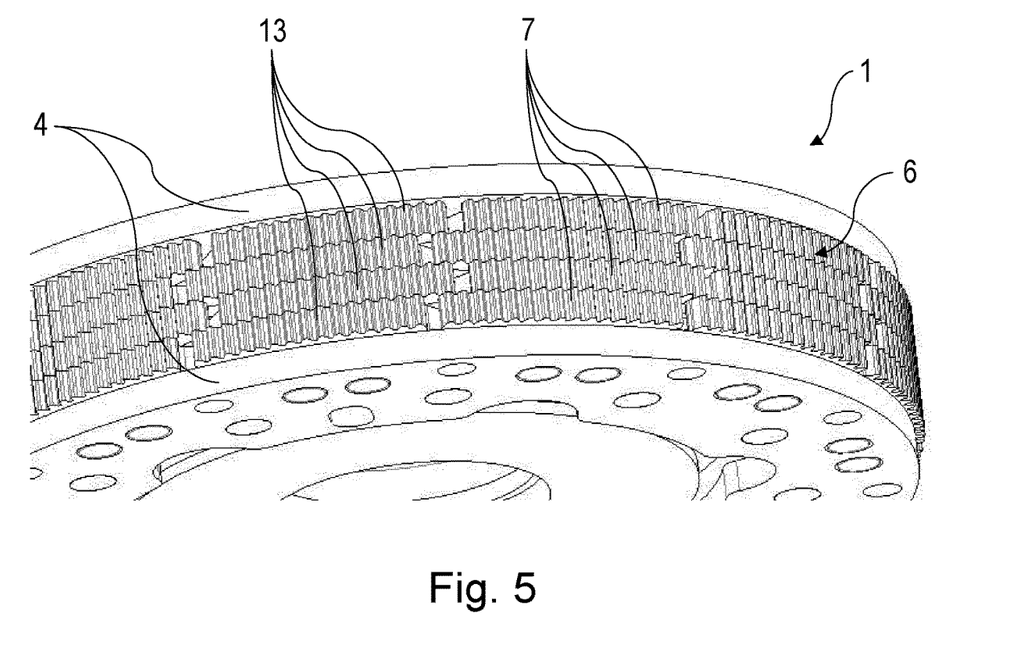
FIG. 5: shows a top view of the flexible gearwheel discs of the gear mechanism shown in FIG. 1 arranged next to one another.

FIG. 5 shows the overlapping arrangement of the gearwheel segments 7 of the flexible gearwheel discs 13. As described above, the individual gearwheel segments 7 are configured asymmetrically. Since neighbouring flexible gearwheel discs 13 are arranged to be rotated by 180° about a radial axis of the gearwheel disc, the head areas of the gearwheel segments 7 overlap. As can be clearly seen in FIG. 4, the overlap is exactly one tooth width. The overlapping of the head areas of the gearwheel segments 7 increases the rigidity of the flexible gearwheel 6.

Figure 6:
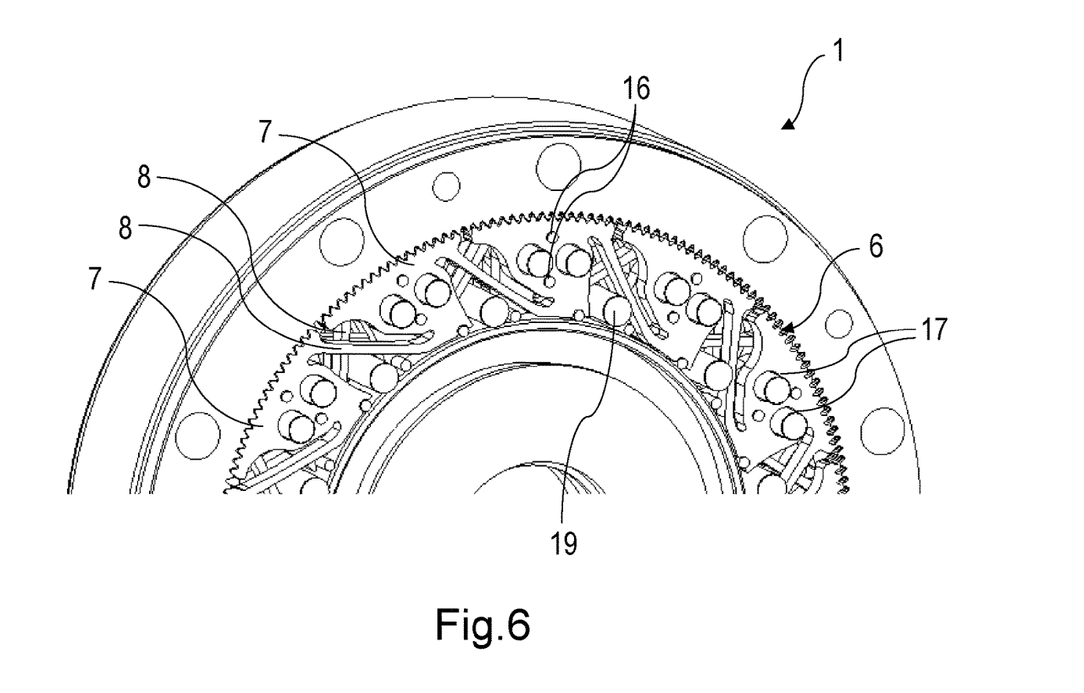
FIG. 6: shows a three-dimensional view of a partial area of the gear mechanism from FIG. 1 without the front support disc.
Figure 7:
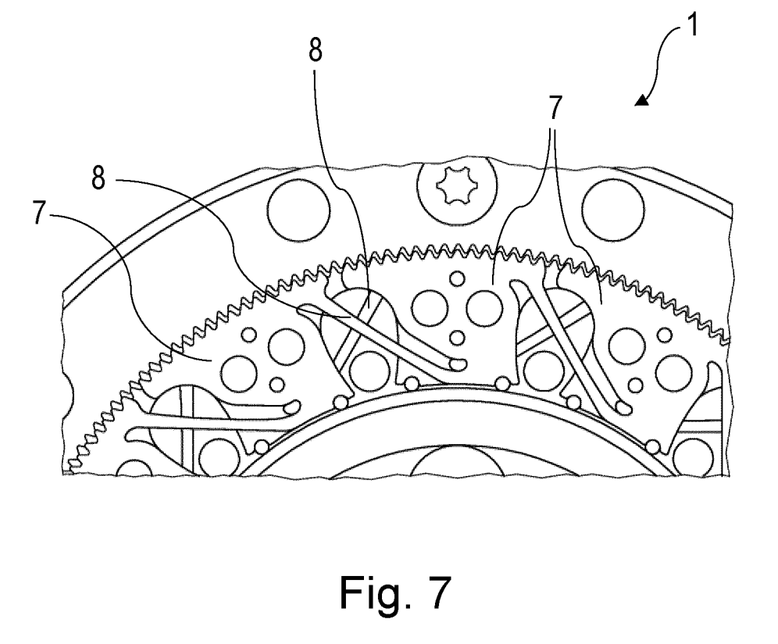
FIG. 7: shows a partial view of the front view of the gear mechanism from FIG. 1 without housing and without front support disc.

FIGS. 6 and 7 show the mesh of the external toothing 10 of the gearwheel segments 7 with the internal toothing 11 of the ring gear 2. Due to the deformation of the flexible gearwheel 2 by means of the wave generator 3, at least two gearwheel segments 7 are always in mesh with the internal toothing 11 of the ring gear 2. As shown by the arrows in FIG. 7, the center gearwheel segment 7 is pressed outwards by the wave generator 3 and thus rotates in an anti-clockwise direction. The diagonal arrangement of the spring segments 8 causes the neighbouring gearwheel segments 7 of the same flexible gearwheel discs 13 to rotate in the opposite direction, i.e. clockwise. The gearwheel segments of a flexible gearwheel disc 13 are prevented from rotating in the same direction; the gearwheel segments can only rotate alternately in opposite directions. This leads to an increase in the rigidity of the flexible gearwheel discs 13 and thus of the flexible gearwheel 6. Since flexible gearwheel discs arranged adjacent to one another are always arranged rotated by 180° relative to one another about a radial axis of the flexible gearwheel, the gearwheel segment 7 of the flexible gearwheel disc 13 shown in FIG. 7 second or rear from the viewer's perspective rotates clockwise and the gearwheel segments 7 arranged adjacent to it rotate correspondingly anti-clockwise. The gearwheel segments 7 of the rear or second flexible gearwheel disc 13 in FIG. 7 thus rotate in exactly the opposite direction to the gearwheel segments 7 of the first or front flexible gearwheel disc 13. Since the gearwheel segments 7 of the gearwheel discs 13 arranged adjacent to one another are pinned together, the gearwheel segments are prevented from rotating in the same direction, thereby further increasing the rigidity of the flexible gearwheel 6 in the circumferential direction.

Figure 8:
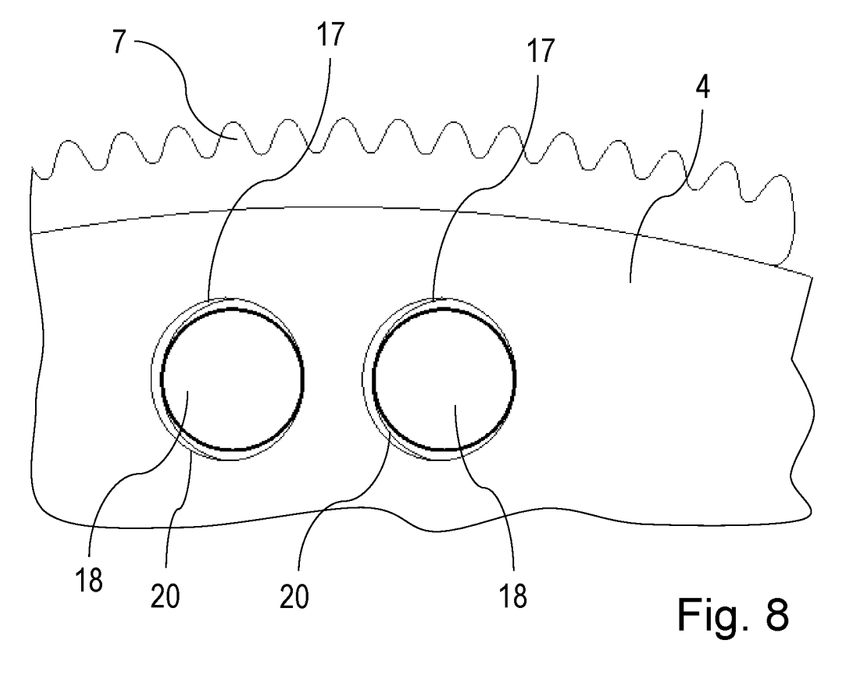
FIG. 8: shows a detail of the gear mechanism from FIG. 1.

FIG. 8 shows the arrangement of the recesses 17 in the gearwheel segments 7 and the recesses 20 in the support discs 4 as well as the bolts 18 arranged therein. The recesses 17 in the gearwheel segments 7 and the recesses 20 in the support discs 4 are formed as elliptical contours of the same circumferential length in the embodiment shown. The contours of the recesses in the gearwheel segments and the recesses in the support discs can also be arranged rotated by 180° relative to each other. The bolts 18 thus roll on both contours, i.e. on the contour of the recesses 17 of the gearwheel segments 7 and on the contour of the recesses 21 in the support discs 4, which increases the efficiency and service life of the gear mechanism.

However, other embodiment variants are also possible when transmitting the rotary movement of the flexible gearwheel to the support discs. For example, it may be provided that the bolts are mounted in a stationary but rotatable manner relative to the gearwheel segments and roll on closed contours in the support discs. On the other hand, it can be provided that the bolts are mounted in a stationary but rotatable manner relative to the support discs and roll on closed contours in the gearwheel segments 7.

Figure 9:
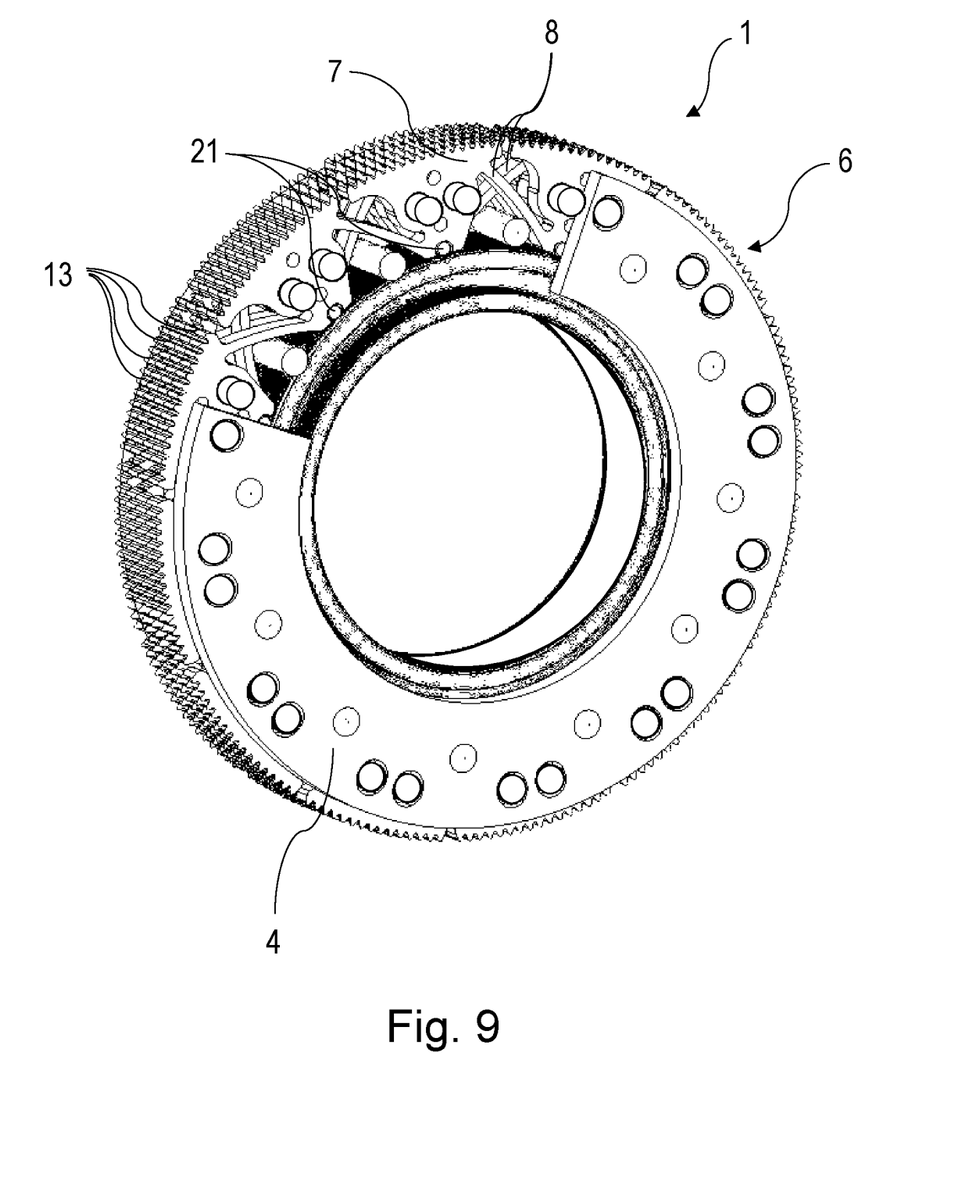
FIG. 9: shows a three-dimensional view of a further embodiment of a gear mechanism according to the disclosure without housing.

FIG. 9 shows a second embodiment of a high reduction gear mechanism 1. The housing and the ring gear of the gear mechanism are not shown in FIG. 9. This second embodiment differs from the first embodiment essentially only in that only one roller 21 is provided in each of the foot areas of the gearwheel segments 7, via which the flexible gearwheel 6 or the flexible gearwheel discs 13 are in contact with the wave generator 3. Each of the rollers 21 is preferably arranged in the center of the foot area 10 of the corresponding gearwheel segment 7. The further configuration of the flexible gearwheel discs 13 and thus also of the flexible gearwheel 6 and the gear mechanism 1 corresponds to the configuration already described with reference to FIGS. 1 to 8.

LIST OF REFERENCE SIGNS 1 gear mechanism
2 ring gear
3 wave generator
4 support disc
5 housing
6 flexible gearwheel
7 gearwheel segment
8 spring segment
9 head area gearwheel segment
10 foot area gearwheel segment
11 external toothing gearwheel segments
12 internal toothing ring gear
13 flexible gearwheel discs
14 slot
15 undercut
16 pin
17 recesses of the gearwheel segments
18 bolt
19 axes
20 recesses of the support discs
21 rollers
U circumferential direction flexible gearwheel
L longitudinal axis spring segment
A axial direction
R radial direction
T tangent
α angle

What is claimed is:

1. A flexible gearwheel for a gear mechanism comprising at least two flexible gearwheel discs arranged next to one another in the axial direction, each flexible gear wheel disc having at least two gearwheel segments arranged next to one another in the circumferential direction of the respective flexible gearwheel disc, the gear wheel segments being connected to one another by means of spring segments, wherein the spring segments run obliquely to the circumferential direction of the respective flexible gearwheel disc and wherein the flexible gearwheel discs are arranged such that the spring segments of the flexible gearwheel discs that are arranged next to one another intersect.

2. The flexible gearwheel according to claim 1, wherein at least one of the gearwheel segments of each flexible gearwheel disc is firmly connected to the gearwheel segment of the flexible gearwheel disc arranged next to it in the axial direction.

3. The flexible gearwheel according to claim 1, wherein the gearwheel segments of the flexible gearwheel discs arranged next to one another in the axial direction are pinned together.

4. A gear mechanism with a ring gear, with a flexible gearwheel arranged in the ring gear and with a wave generator which is connected to the flexible gearwheel and which deforms the flexible gearwheel so that it meshes with the ring gear in certain areas, and wherein the flexible gearwheel is configured according to claim 1.

5. The gear mechanism according to claim 4, wherein at least one of the gearwheel segments is connected to an output drive such that a rolling rotary movement of the flexible gearwheel is transmitted into a simple rotary movement.

6. The gear mechanism according to claim 4, wherein a support disc is arranged on at least one side of the flexible gearwheel and a bolt, which is in contact with the at least one support disc, is guided through at least one of the gearwheel segment groups formed by the gearwheel segments lying next to one another in the axial direction.

7. The gear mechanism according to claim 6, wherein the at least one bolt is mounted in a stationary but rotatable manner relative to the at least one gearwheel segment group and rolls on a self-contained contour in the at least one support disc.

8. The gear mechanism according to claim 6, wherein the at least one bolt is mounted in a stationary but rotatable manner relative to the at least one support disc and rolls on a self-contained contour in the at least one gearwheel segment group.

9. The gear mechanism according to claim 6, wherein the at least one bolt rolls both on a closed contour in the at least one supporting disc and on a closed contour in the at least one gearwheel segment group, wherein the contour of the at least one supporting disc and the contour of the at least one gearwheel segment group are configured such that their circumferential length is the same.

10. The gear mechanism according to claim 6, wherein the spring segments of the flexible gearwheel discs lying next to one another in the axial direction intersect at the radial height of the at least one bolt.

11. The gear mechanism according to claim 4, wherein two rollers are in contact with the at least one wave generator, are arranged in a foot area of at least some of the gearwheel segment groups of the flexible gearwheel formed by the gearwheel segments lying next to one another in the axial direction.

12. The gear mechanism according to claim 6, wherein support discs are arranged on both sides of the flexible gearwheel.

13. The flexible gearwheel according to claim 1, wherein the spring segments of each flexible gear wheel disc lie in a plane with the gearwheel segments of the respective flexible gear wheel disc.

14. The flexible gearwheel according to claim 1, wherein a longitudinal axis of each spring segment of each flexible gear wheel disc includes an angle α>0° with a tangent lying at a central circumferential position of the spring segment on the circumference of the flexible gearwheel disc.

15. The flexible gearwheel according to claim 1, wherein at least one of the spring segments of each flexible gear wheel disk extends from a head area of a gearwheel segment of the respective flexible gear wheel disc to the foot area of the gearwheel segment arranged next to it in the circumferential direction of the respective flexible gearwheel disc.

16. The flexible gearwheel according to claim 1, wherein a slot is formed in the foot area of at least one of the gearwheel segments of each flexible gear wheel disc above the spring segment of the respective flexible gear wheel disc.

17. The flexible gearwheel disc according to claim 1, wherein an undercut is formed in the head region of at least one of the gearwheel segments of each flexible gear wheel disc below the spring segment of the respective flexible gear wheel disc.

18. The flexible gearwheel according to claim 2, wherein in the circumferential direction at least every second one of the gearwheel segments of each flexible gearwheel disc is firmly connected to the gearwheel segment of the flexible gearwheel disc arranged next to it in the axial direction.

19. The flexible gearwheel according to claim 14, wherein the angle $\alpha$ is in a range of 10°-70°.

20. The flexible gearwheel according to claim 19, wherein the angle $\alpha$ is in a range of 35°-55°.

\* \* \* \* \*